US012540093B2

(12) United States Patent
Swogger et al.

(10) Patent No.: US 12,540,093 B2
(45) Date of Patent: Feb. 3, 2026

(54) METHODS OF LIPID RECOVERY AND LEACHATE TREATMENT

(71) Applicant: U.S. Clean Water Technology, Inc., Austin, TX (US)

(72) Inventors: Kurt W. Swogger, Austin, TX (US); John Richard Graves, Austin, TX (US); Philip J. Carlberg, Austin, TX (US)

(73) Assignee: U.S. Clean Water Technology, Inc., Austin, TX (US)

( * ) Notice: Subject to any disclaimer, the term of this patent is extended or adjusted under 35 U.S.C. 154(b) by 0 days.

(21) Appl. No.: 18/957,190

(22) Filed: Nov. 22, 2024

(65) Prior Publication Data

US 2025/0162920 A1 May 22, 2025

Related U.S. Application Data

(60) Provisional application No. 63/602,279, filed on Nov. 22, 2023.

(51) Int. Cl.
*C02F 9/00* (2023.01)
*C02F 1/463* (2023.01)
*C02F 1/66* (2023.01)
*C02F 1/68* (2023.01)
*C02F 1/72* (2023.01)
*C02F 101/16* (2006.01)
*C02F 101/32* (2006.01)
*C02F 101/34* (2006.01)
*C02F 101/36* (2006.01)
*C02F 103/06* (2006.01)

(52) U.S. Cl.
CPC ............. *C02F 9/00* (2013.01); *C02F 1/463* (2013.01); *C02F 1/66* (2013.01); *C02F 1/68* (2013.01); *C02F 1/72* (2013.01); *C02F 2101/16* (2013.01); *C02F 2101/32* (2013.01); *C02F 2101/34* (2013.01); *C02F 2101/36* (2013.01); *C02F 2103/06* (2013.01); *C02F 2303/04* (2013.01)

(58) Field of Classification Search
None
See application file for complete search history.

(56) References Cited

U.S. PATENT DOCUMENTS

2020/0399147 A1* 12/2020 Yost .......................... C02F 1/34

OTHER PUBLICATIONS

Frank Barranco, "Tangible Benefits of Thermally Treating PFAS-Impacted Materials", EA Engineering, Science and Technology, Inc., https://eaest.com/insight/tangible-benefits-of-thermally-treating-pfas-impacted-materials/.

(Continued)

*Primary Examiner* — Peter Keyworth
(74) *Attorney, Agent, or Firm* — HUNTON ANDREWS KURTH LLP

(57) ABSTRACT

A process for removing oil and other organics especially lipids from process steams comprising lipids, brown grease, and water is disclosed and a process to remove metals and organics from leachate from landfills and other waste sites that generate contaminated water streams. The process involves adjusting pH and using electrical fields generated by a device comprising electrodes to induce gas bubbles. The gas bubbles facilitate the movement of lipids toward the surface of the solution where they may be skimmed off and recovered.

6 Claims, 1 Drawing Sheet

(56) References Cited

OTHER PUBLICATIONS

Bamdad, H.; Papari, S.; Moreside, E.; Berruti, F. High-Temperature Pyrolysis for Elimination of Per- and Polyfluoroalkyl Substances (PFAS) from Biosolids. Processes 2022, 10, 2187. https://doi.org/10.3390/pr10112187.

"Application of Supercritical Water Oxidation to Effectively Destroy Per- and Polyfluoroalkyl Substances in Aqueous Matrices", Christopher G Scheitlin, Kavitha Dasu, Stephen Rosansky, Lindy Espina Dejarme, Dinusha Siriwardena, Jonathan Thorn, Larry Mullins, Ian Haggerty, Krenar Shqau, and Julia Stowe, ACS ES&T Water 2023 3 (8), 2053-2062, DOI: 10.1021/acsestwater.2c00548.

\* cited by examiner

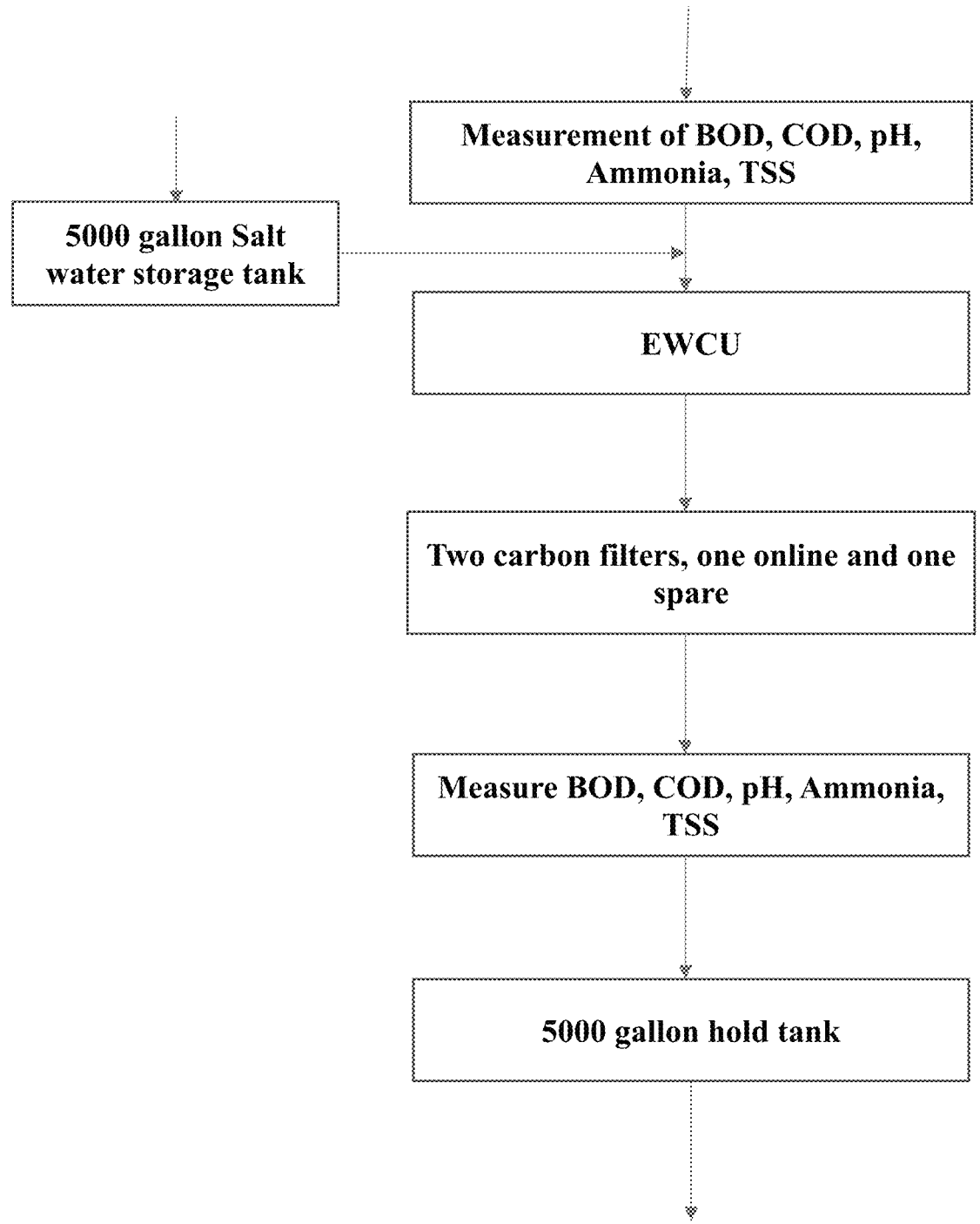

METHODS OF LIPID RECOVERY AND LEACHATE TREATMENT

CROSS-REFERENCE TO RELATED APPLICATIONS

This application claims priority to U.S. Provisional Application No. 63/602,279 filed on Nov. 22, 2023 which application is incorporated herein by reference. This application is also related to U.S. Pat. Nos. 9,896,355 and 10,968,119, the disclosures of which are incorporated herein by reference.

FIELD OF THE INVENTION

A water treatment device and process to remove lipids from an aqueous stream using a low energy process.

BACKGROUND AND SUMMARY

The process flow to remove Lipids both soluble and insoluble from aqueous solution and emulsions involves acidification and subsequent removal by a device using electromagnetic fields. The initial process 25 stream is adjusted to pH less than 7. The pH adjusted initial process stream can optionally flow to a decanting device that separates insoluble Lipids from the remainder of the initial process stream. The process stream is then flowed to a device that causes separation or oxidation of the Lipids or its salts. The device consists of parallel plates of titanium alternating with titanium plates coated with ruthenium oxide, iridium oxide or combinations of ruthenium oxide and iridium oxide contained in a tank. The plates when connected to direct electric current act to create electromagnetic fields which coalesce emulsion of the acid that then can be skimmed and which creates peroxides or hydroxides or other reactive oxygen species that oxidize any soluble organics.

In a first aspect, the invention is a process to recover Lipids from an aqueous stream comprising lipids comprising the steps, optionally sequential steps, of:
a) adjusting the pH of the Lipids with an aqueous diluent,
b) optionally adding a hydrocarbon diluent,
c) treating the lipid derivative in aqueous diluent with an electrical field such that the lipid derivative coalesces into larger droplets and,
d) recovering the larger droplets, thereby removing at least 50% of the Lipid derivative from the oil stream,
e) oxidizing any soluble forms of the Lipids or any other organics by hydroxy and peroxide groups or other reactive oxygen species,
f) formed by an electric field generated by use of Titanium comprising an electrode and by the use of coatings of ruthenium oxide or iridium oxide or combinations thereof applied to titanium electrodes.

Optionally, and preferably, a decanting step is inserted in a pretreatment module after step (a) in the first aspect above. After addition of the aqueous diluent stream, preferably comprising at least one acid, comprising alkaline soaps of acid oils, including Fats, Oils, Grease, ester acid oils and Lipids oil, the process stream is separated into an aqueous stream still containing the acid and an acid oil stream. The aqueous stream is then pumped to a decanting device (such as a decanter or centrifuge) to remove coagulated oil and then pumped to the electro-magnetic or electrical field generating device. The aqueous stream my optionally be heated to 150-350 F at a pressure of 100-250 psi. The resulting coagulated acid oil is then recovered.

The terms aqueous stream and aqueous diluent stream can be used interchangeably.

Step (e) can have a pH adjusted to from about 1 to about 8.

The electrical field of step (c) can generate hydrogen gas bubbles which attach to the Lipids.

The aqueous diluent stream of step (a) can have a pH of about 4 or less, preferably 3 or less, more preferably 2 or less, most preferably 1 or less.

The voltage of the electric field can be at least 1 V, 10 V, 100 V, 1 kV, or even at least 20 kV. The maximum Voltage of the electric field can be less than 50 kV, less than 30 kV, less than 10 kV, less than 1 kV, or even less than 100 V.

The average amperage of the electric field can be at least 1 amp, 50 amps, or even at least 100 amps. According to at least some embodiments, the maximum amps can be less than 200 amps, less than 100 amps, less than 50 amps, or less than 10 amps.

The Lipid can further comprise aqueous soluble organic compounds.

The soluble organic compounds can be at least 70% oxidized, preferably at least 80% oxidized, more preferably at least 90% oxidized, most preferably at least 98% oxidized.

Another embodiment of the invention is a process to produce water comprising less than 10,000 ppm organic lipids, more preferably 1000 ppm, most preferably 100 ppm from a Lipids-containing emulsion stream comprising the sequential steps of:
a) adjusting the pH of the Lipids with a first aqueous diluent,
b) optionally adding a hydrocarbon diluent,
c) treating the Lipids in aqueous diluent with an electrical field such that the Lipids coalesces into larger droplets and,
d) recovering the larger droplets, thereby removing at least 50% of the Lipids from the oil stream. Optionally, and preferably, a decanting step is inserted in a pretreatment module after step (a) in the first aspect above. After addition of the aqueous diluent stream, preferably comprising at least one acid, comprising alkaline soaps of acid oils, including Fats, Oils, Grease, ester acid oils and Lipids oil, the process stream is separated into an aqueous stream still containing the acid and an acid oil stream. The aqueous stream is then pumped to a decanting device (such as a decanter or centrifuge) to remove coagulated oil and then pumped to the electro-magnetic or electrical field generating device. The resulting coagulated acid oil is then recovered. The first aqueous diluent stream of step (a) can have a pH of about 4 or less, preferably 3 or less, more preferably 2 or less, most preferably 1 or less. The aqueous diluent of step (a) can be a mineral acid such as sulfuric acid, hydro chloric acid and the like.

The electrical field of step (c) can generate hydrogen gas bubbles which attach to the Lipids.

The voltage of the electric field can be at least 1V, 1 OV, 100\7, 1 kV, or even at least 20 kV. The maximum Voltage of the electric field can be less than 50 kV, less than 30 kV, less than 10 kV, less than 1 kV, or even less than 100V.

The average amperage of the electric field can be at least 1 amp, 50 amps, or even at least 100 amps. According to at least some embodiments, the maximum amps can be less than 200 amps, less than 100 amps, less than 50 amps, or less than 10 amps.

The pH adjusted Lipids of step (a) can further comprise aqueous soluble organic compounds. The soluble organic compounds can be at least 70% oxidized, preferably at least 80% oxidized, more preferably at least 90% oxidized, most preferably at least 98% oxidized.

BRIEF DESCRIPTION OF THE DRAWINGS

FIG. 1 shows a block flow diagram of a representative leachate process.

DETAILED DESCRIPTION OF THE INVENTION

A primary objective of this device called an Electric Water Cleaning Unit (EWCU) is to provide an expandable waste water treatment system which involves a series of module sections in which can be assembled or where sections can be removed to form a waste water treatment system. This system comprises a series of contaminate collection chambers which attach to both ends of a main treatment module(s). The main treatment module(s) houses a preferred electro chemistry method using both ion donating and mixed metal oxide anodes and cathodes. However, the present invention should not be considered, limited or interpreted as merely electro chemistry function performed inside tanks, but where more consideration should be placed on the utility of an expandable assembly utilized for fluid treatment. Other methods such as aeration or chemical dosing can be performed In the main treatment module(s) where a fluid process may require constant flow while working in tandem with chemical mixing for a pre- or post-treatment of a fluid. The waste water influent slated for treatment can be introduced into the system in continuous flow and where this influent is used as an electrolyte for electrical conductively between an anode and cathode array, Once DC voltage is applied to the array, micro bubbles of hydrogen and oxygen are produced, and once these bubbles generate and release from the anode and cathode arrays, they begin rising up through the water column and attach to contaminate flocculations formed by electro-chemistry reactions. Once contaminates reach the surface, they can be skimmed by a surface skimming device and deposited into either the beginning, center or ending contaminate collection chambers.

Electro-Coagulation is an electrochemistry method used to coagulate wastewater contaminates for ease of separation and collection from the wastewater stream. Wastewater when exposed to a controlled electrical field allows microscopic solids to attract, (like magnetism) forming higher concentrations of solids for greater removal efficiencies.

Selective material types or coatings applied to the anodes and cathodes provide several unique abilities in utilizing half redox ion reactions in which can enhance the fluid treatment process. Mixed Metal Oxidizes, (MMO) typically used are non-donors of ions to the influent and where based on the type of MMO's selected, certain electrochemistry reactions can occur. For example, if combining titanium anodes with ruthenium oxide coated cathodes and if the influent contains salinity, chlorine is evolved which can be used to dis-infect the effluent. The electromagnetic field created by the selected materials used in the electrodes creates hydroxyl and peroxide ions or other reactive oxygen species that can be made more active by rocking, vibrating or shaking the electrodes improving the oxidation by at least 1% and as high as at least 50%.

The electromagnetic field created by electrodes to create hydroxyl and peroxide ions or other reactive oxygen species is made more active by rocking, vibrating or shaking the electrodes increasing mass transfer rates. The oxidation is increased by at least 1% and as much as 150% with 170 Hz mechanical vibration and as much as 90% with 45 kHz ultrasonic agitation compared to stationary electrode with no rocking, vibrating or shaking.

Salt removal is only needed if the water has unacceptable salt concentrations. The water must be cooled to less than 70 degrees F., preferably below 50 degrees F. to allow proper operation for the next step, salt removal. The organic materials must be removed to a level of less than 1% prior to salt removal to permit efficient salt removal.

The cooled, organic free water is treated by a technology from ECR Desalination that relies on electro-chemistry techniques for separating salt from salt contaminated water without using costly membranes. This technology has been in commercial scale use starting in 2004 for applications other than producing clean water from salty water up to 9000 gallons per minute. Salt is removed via a special low energy field effect technique producing clean water and solid salts which are then separated. The mechanism for solid salt formation is ionic nucleation which can happen at much lower salt concentrations than conventional crystallization. Sodium chloride crystallizes as 23.5% whereas this process can allow precipitation at less than 1%. The solid salt generated has hydrogen bubbles attached so it will float, a novel approach to making separation easier than having salt settle to the bottom which can lead to plugging and loss of separation. The floating salt is skimmed off, decanted off or filtered off the clean water. So much salt is removed that Water can meet drinking water specification for the United States if needed or to make irrigation or river disposal standards. Once separated, salt can be dried and formed into any size and shape particle for uses in many applications from food, water softening and industrial. Alternatively, the salt can be made into a concentrated brine for other uses requiring a liquid form in water for applications such as fracking. It is well known that some membrane technology costs are about $1.65 (operation and maintenance) per 1,000 gallons of desalinated potable water. ECR has a related cost at a comparable size at about $0.12 per 1,000 gallons of desalinated water. The process runs at constant current of about 30-60 amps at 4-7 volts (voltage varies depending on conductivity of the water and concentration of the water salts, organics and other conductive materials.

Example 1

A 1 weight percent solution of glycerin in deionized water was used to demonstrate the effect of agitation on the oxidation of organic compounds. As the glycerin oxidizes it reacts to form smaller and smaller molecules. Carbon Oxygen Demand (COD) provides a measure of the organic content of the solution. By measuring COD during an oxidation reaction one can track the disappearance of the organic compounds with time and thereby quantify oxidation under different agitation conditions.

For each experiment 450 ml of the glycerin solution were placed in a 500 ml glass beaker. NaCl was added to make a 1 weight percent NaCl solution by weight. The NaCl was necessary for the solution to be electrically conductive. MMO and titanium electrodes, separated by 0.25 inches were inserted into the solution and DC power was established to the electrodes. The voltage was controlled so that current flow between the electrodes was steady at 10 amps. The decrease in COD level of the solutions was determined after 60 minutes.

Experiment 1—no agitation, rocking or vibration, COD reduction 2230 ppm
Experiment 2—beaker placed in ultrasonic bath@45 kHz, COD reduction 4180 ppm
Experiment 3—mechanical vibration of electrodes@200 Hz, COD reduction 5775 ppm Compared to Experiment 1, oxidation was improved in Experiment 2 by 90%, and in Experiment 3 by 160%.

The combination of the organic removal unit, cooling unit and the salt removal unit is a unique and novel combination allowing for cleanup and reuse of waste from oil production allowing oil recovery, water recycle, salt recycle and potable water production.

Embodiments

A process to recover lipids from an aqueous stream comprising the steps of:
  a. adjusting the pH of the lipids with an aqueous diluent,
  b. optionally adding a hydrocarbon diluent,
  c. treating the lipid derivative in aqueous diluent with an electrical field such that the lipid derivative coalesces into larger droplets and,
  d. recovering the larger droplets, thereby removing at least 50% of the lipid derivative from the oil 30 stream.
  e. oxidizing any soluble forms of the Lipids or any other organics by hydroxy and peroxide groups or other reactive oxygen species,
  f. formed by an electric field generated by at least one electrode comprising titanium and/or the at least one electrode comprising coatings of ruthenium oxide or iridium oxide or combinations applied to said titanium electrode.

The process of embodiment 1 wherein the aqueous diluent of step (a) has a pH of less than about 4.

The process of embodiment 1 wherein the aqueous diluent of step (a) has a pH of less than about 1.

Process of embodiment 1 wherein the aqueous diluent is a mineral acid.

Process of embodiment 1 wherein the preferred aqueous diluent is sulfuric acid.

The process of embodiment 1 wherein step (a) has an adjusted pH from less than about 8 to more than about 0.01.

The process of embodiment 1 wherein the salt is converted to Lipids.

The process of embodiment 1 wherein the electrical field of step (f) generates hydrogen gas bubbles which attach to the Lipids.

The process of embodiment 1 wherein the electric field has a direct current voltage of at least 1 V, 10 V, 100 V, 1 kV, or even at least 20 kV and the electric field has a maximum Voltage of less than 50 kV, less than 30 kV, less than 10 kV, less than 1 kV, or even less than 100 V.

The process of embodiment 1 wherein the electric field has an average amperage of at least 1 amp, 50 amps, or even at least 100 amps and the electric field has a maximum amps of less than 200 amps, less than 100 amps, less than 50 amps, or less than 10 amps.

A process to produce water comprising less than 10,000 ppm Lipids derivatives from an Lipid containing emulsion stream comprising the sequential steps of:
  a. adjusting the pH of the Lipids with a first aqueous diluent,
  b. optionally adding a hydrocarbon diluent,
  c. treating the Lipids in aqueous diluent with an electrical field such that the Lipids coalesces into larger droplets and,
  d. recovering the larger droplets, thereby removing at least 50% of the Lipids from the oil stream.

The process of embodiment 11 wherein the first aqueous diluent of step (a) has a pH of less than about 4.

Process of embodiment 11 wherein the aqueous diluent is a mineral acid.

Process of embodiment 11 wherein the aqueous diluent is sulfuric acid.

The process of embodiment 11 wherein step (c) has an adjusted pH from about 8 to less than about 0.01.

The process of embodiment 11 wherein the electrical field of step (c) generates hydrogen gas bubbles which attach to the Lipids.

The process of embodiment 11 wherein the electrical field has a direct current voltage of at least 1 V, 10 V, 100 V, 1 kV, or even at least 20 kV and the electric field has a maximum Voltage of less than 50 kV, less than 30 kV, less than 10 kV, less than 1 kV, or even less than 100 V.

The process of embodiment 11 wherein the electric field has an average amperage of at least 1 amp, 50 amps, or even at least 100 amps and the electric field has a maximum amps of less than 200 amps, less than 100 amps, less than 50 amps, or less than 10 amps.

The process of embodiment 18 wherein the Lipids in the Lipids containing emulsion stream further comprises aqueous soluble organic compounds.

The process of embodiment 18 wherein the soluble organic compounds are at least 70 weight % oxidized.

A process to use an electromagnetic field created by electrodes to create hydroxyl and peroxide ions or other reactive oxygen species that is made more active by rocking, vibrating or shaking the electrodes thereby improving mass transfer of the reactive species and increasing the oxidation by at least 1% and as high as at least 50% compared to stationary electrodes with no rocking, vibrating or shaking.

A process to use an electromagnetic field created by electrodes to create hydroxyl and peroxide ions or other reactive oxygen species that is made more active by rocking, vibrating or shaking the electrodes to keep the electrodes from coating by at least 1% and as high as at least 50% compared to stationary electrodes with no rocking, vibrating or shaking.

The process of embodiment 1 wherein a decanting step is inserted after step (a).

The process of embodiment 11 wherein a decanting step is inserted after step (a).

A process to recover Lipids from an aqueous stream comprising Lipids, the process comprising the sequential steps of:
  a. adjusting the pH of the Lipids with an aqueous diluent,
  b. optionally adding a hydrocarbon diluent,
  c. treating the lipid derivative in aqueous diluent with an electrical field such that the lipid derivative coalesces into droplets, preferably larger droplets than formed without electrical field application, and,
  d. recovering the larger droplets, thereby removing at least 50% of the Lipids from the oil stream.
  e. oxidizing any soluble forms of the Lipids or any other organics by hydroxy and peroxide groups or other reactive oxygen species,
  f. formed by an electric field generated by use of Titanium comprising an electrode and by the use of coatings of ruthenium oxide or iridium oxide or combinations applied to titanium electrodes.

The process of embodiment 25 wherein the aqueous diluent of step (a) has a pH of less than about 4.

The process of embodiment 25 wherein the aqueous diluent of step (a) has a pH of less than about 1.

The process of embodiment 25 wherein the aqueous diluent is a mineral acid.

The process of embodiment 25 wherein the preferred aqueous diluent is sulfuric acid.

The process of embodiment 25 wherein step (a) has an adjusted pH from less than about 8 to more than 0.01.

The process of embodiment 25 wherein the salt is converted to Lipids.

The process of embodiment 25 wherein the electrical field of step (f) generates hydrogen gas bubbles which attach to the Lipids.

The process of embodiment 25 wherein the electric field has a direct current voltage of at least 1 V, 10 V, 100 V, 1 kV, or even at least 20 kV and the electric field has a maximum Voltage of less than 50 kV, less than 30 kV, less than 10 kV, less than 1 kV, or even less than 100 V.

The process of embodiment 25 wherein the electric field has an average amperage of at least 1 amp, 50 amps, or even at least 100 amps and the electric field has a maximum amps of less than 200 amps, less than 100 amps, less than 50 amps, or less than 10 amps.

The process of embodiment 25 wherein a decanting step is inserted after step a.

The process of embodiment 1 wherein the aqueous diluent stream of step (a) has a pH of less than about 4 and 40 more than about 0.01.

The process of embodiment 11 wherein the aqueous diluent stream of step (a) has a pH of less than about 4 and more than about 0.01.

The process of embodiment 25 wherein the aqueous diluent stream of step (a) has a pH of less than about 4 and more than about 0.01.

The process of embodiment 1 wherein the aqueous diluent stream of step (a) has a pH of less than about 1 and more than about 0.01.

The process of embodiment 11 wherein the aqueous diluent stream of step (a) has a pH of less than about 1 and more than about 0.01.

The process of embodiment 25 wherein the aqueous diluent stream of step (a) has a pH of less than about 1 and more than about 0.01.

The process of embodiment 11 wherein the aqueous diluent of step (a) has a pH of less than about 1.

Other Embodiments

1. A process to recover lipids from an aqueous stream comprising lipids wherein the process comprises:
   a) adjusting pH of the aqueous stream to less than 5 (preferably less than 4) with an aqueous acid;
   b) optionally adding a hydrocarbon diluent to the aqueous stream;
   c) treating the aqueous stream with an electrical field under conditions such that the lipid derivative coalesces into larger droplets that float to the surface of the aqueous system,
   d) recovering the larger droplets thru decantation, thereby removing at least 50% of the Lipids from the aqueous stream,
   e) Preferably recovering the larger droplets through decantation, thereby removing at least 80% of the Lipids from the aqueous stream,
   f) oxidizing any soluble forms of the Lipids or any other organics by hydroxy and peroxide groups or other reactive oxygen species in the remaining aqueous stream, formed by an electric field generated by electricity to at least one electrode comprising titanium and at least one electrode comprising coatings of ruthenium oxide or iridium oxide or combinations applied to said titanium electrode.
   g) and increasing pH of aqueous stream comprising the lipid derivative using a weak base material such as sodium carbonate, sodium bicarbonate and others, to ph 6-8 to convert the lipid derivative to lipid form,
   h) and decant the final product lipid from the aqueous stream.

2. The process of embodiment 1 wherein the aqueous acid of step has a pH of less than about 4.

3. The process of embodiment 1 wherein the aqueous diluent is a mineral acid.

4. The process of embodiment 1 wherein the preferred aqueous diluent is sulfuric acid.

5. The process of embodiment 1 wherein the electrical field of step f) generates hydrogen gas bubbles which attach to the Lipids.

6. The process of embodiment 1 wherein the electric field has a direct current voltage of at least 1 V and the electric field has a maximum Voltage of less than 50 kV.

7. The process of embodiment 1 wherein the electric field has an average amperage of at least 1 amp and the electric field has a maximum amps of less than 200 amps.

8. A process to produce water comprising less than 10,000 ppm Lipids derivatives from an Lipid containing aqueous stream comprising the sequential steps of:
   a) adjusting the pH of the Lipids with a first aqueous diluent,
   b) optionally adding a hydrocarbon diluent,
   c) treating the Lipids in aqueous diluent with an electrical field such that the Lipids coalesces into larger droplets and,
   d) recovering the larger droplets, thereby removing at least 50% of the Lipids from the oil stream.

9. The process of embodiment 10 wherein the first aqueous diluent of step a) has a pH of less than about 4.

10. Process of embodiment 10 wherein the aqueous diluent is a mineral acid.

11. Process of embodiment 10 wherein the aqueous diluent is sulfuric acid.

12. The process of embodiment 10 wherein the electrical field of step c) generates hydrogen gas bubbles which attach to the Lipids.

13. The process of embodiment 10 wherein the electrical field has a direct current voltage of at least 1 V and the electric field has a maximum Voltage of less than 50 kV.

14. The process of embodiment 10 wherein the electric field has an average amperage of at least 1 amp and the electric field has a maximum amps of less than 200 amps.

15. The process of embodiment 10 wherein the Lipids in the Lipids containing emulsion stream further comprises aqueous soluble organic compounds.

16. The process of embodiment 18 wherein the soluble organic compounds are at least 70 weight % oxidized.

17. A process to use an electromagnetic field created by electrodes to create hydroxyl and peroxide ions or other reactive oxygen species that is made more active by rocking, vibrating or shaking the electrodes increasing the oxidation by at least 1% and as high as at least 50% compared to stationary electrodes with no rocking, vibrating or shaking.

18. A process to use an electromagnetic field created by electrodes to create hydroxyl and peroxide ions or other reactive oxygen species that is made more active by rocking, vibrating or shaking the electrodes to keep the electrodes from coating by at least 1% and as high as at least 50% compared to stationary electrodes with no rocking, vibrating or shaking.

19. The process of embodiment 1 wherein a decanting step is inserted after step (a).

20. The process of embodiment 10 wherein a decanting step is inserted after step (a).

21. A process to recover lipids from an aqueous stream comprising lipids, the process comprising the sequential steps of:
a) adjusting the pH of the Lipids with an aqueous diluent,
b) optionally adding a hydrocarbon diluent,
c) treating the lipid derivative in aqueous diluent with an electrical field such that the lipid derivative coalesces into larger droplets and,
d) recovering the larger droplets, thereby removing at least 50% of the Lipids from the oil stream,
e) oxidizing any soluble forms of the Lipids or any other organics by hydroxy and peroxide groups or other reactive oxygen species,
f) formed by an electric field generated by use of Titanium comprising an electrode and by the use of coatings of ruthenium oxide or iridium oxide or combinations applied to titanium electrodes.

22. The process of embodiment 24 wherein the aqueous diluent of step a) has a pH of less than about 4.

23. The process of embodiment 24 wherein the aqueous diluent comprises mineral acid.

24. The process of embodiment 24 wherein the aqueous diluent comprises sulfuric acid.

25. The process of embodiment 24 wherein the salt is converted to Lipids.

26. The process of embodiment 24 wherein the electrical field of step f) generates hydrogen gas bubbles which attach to the Lipids.

27. The process of embodiment 24 wherein the electric field has a direct current voltage of at least 1 V and the electric field has a maximum Voltage of less than 50 kV.

28. The process of embodiment 24 wherein the electric field has an average amperage of at least 1 amp and the electric field has a maximum amps of less than 200 amps.

29. The process of embodiment 24 wherein a decanting step is inserted after step a).

Leachate Treatment Methods

Description of process flow for leachate treatment from US Clean Water Technology EWCU.

This system may be fully automated excepting carbon bed changeout from spent to fresh carbon periodically. There often may be a need for 3-6% salt water in truck load quantities which can be produced water or from other sources that is added to increase the salt concentration needed for the chemistry of ammonia removal. The unit will usually clean up any produced water if there is substantially no emulsion. Power input it 3 phase 220 volts and is less than 50 KW. A controller is provided to monitor operations and automatically may be set to adjust flow as needed or to shut down if there are operational issues. Given a connection to the internet, all operations including visual and security can be monitored remotely and data for compliance can be stored. The controller operations can be adjusted remotely to adjust flow rates of salt or leachate.

While continuous output of BOD, COD, Ammonia, and TSS measurements are available, routine checks should be made to make sure instruments are calibrated and operating properly.

1. Pump leachate water from pond into a constant level tank that can overflow back into the leachate pond.
2. Add saltwater stream to unit to maintain salt at about 25 times ammonia using 10,000-gallon hold tank for saltwater (buy premade or produced water).
3. Keep saltwater hold tank at least 50% full using purchased brine or produced water.
4. Establish a flow rate of about 30-50 gal/minute to tank EWCU system.
5. If there are spikes in concentrations of BOD and ammonia, the flow rate may need to be reduced and the carbon beds may need earlier change out.
6. Monitor ammonia, BOD, COD and TSS input using on-line analytical system.
7. Calculate amount of salt needed to maintain 25 to 1 salt to ammonia on weight basis.
8. Monitor saltwater density to calculate salt concentration.
9. Operate EWCU to reduce ammonia to 5 ppm or less at an average 35 gpm.
10. Pump EWC effluent through an activated carbon bed to remove BOD to less than 37 ppm and insure TSS goals are met of less than 27 pp.
11. Use online analytical system to monitor ammonia, BOD, COD and TSS.
12. If ammonia starts to rise, check salt concentration and power input.
13. If BOD starts to rise, switch carbon bed to fresh bed.
14. Replace spent carbon bed and send spent carbon to landfill.
15. Pump into holding tank that can hold 5-10,000 gallons.
16. If there is too high concentration to meet permit requirements: divert back to leachate pond
17. Adjust conditions to treat water including salt concentration, flow rate or power input.

Leachates or other materials comprising perfluoroalkyl substances (PFAS) may also be treated using similar methods to that described above and herein. The specific type of PFAS to be treated is not particularly limited and may include long chain PFAS comprising eight or more carbons atoms that are partially or fully fluorinated and/or shorter chain PFAS compounds. In some embodiments, more than 80%, or more than 90%, or more than 95%, or more than 99% or more of the PFAS substances may be destroyed and/or broken down. In some embodiments, the specific mechanism involved may include transfer of electrons from the PFAS substances at, for example, an anode. In some embodiments, the PFAS substances may be degraded by, for example, the formation or presence of oxidants like hydroxyl radicals that facilitate PFAS breakdown. In other embodiments, a combination of electron transfer and the presence of oxidants may be employed.

If desired, catalysts or promoters that facilitate PFAS migration to an anode may be employed. Additionally or alternatively, substances may be employed that prevent or minimize unwanted reactions such as electrolysis of water present. Advantageously, the presently described methods may not require high temperature or high pressure like traditional PFAS treatment techniques.

Specific Embodiments

1. A process for removing organics, metals, bacteria and other biologics, BOD, COD, ammonia and other inorganics from aqueous leachate from landfills, coal and coal ash storage sites, incinerator sites, and other sites where rainwater can collect waste residuals by
 a. Pumping leachate into a EWCU system wherein the leachate is treated with an electric field,
 b. Adjusting the salt concentration to a multiple of the concentration of ammonia
 c. Pumping the leachate though a sand filter and/or carbon bed.
 d. Converting ammonia into nitrogen released to atmosphere
 e. Oxidizing hydrocarbon based compounds.
 f. Converting metals into the oxidized form which can be removed by filtration.

2. The process as described in claim 1 in which the multiple of salt to ammonia on a mass basis is greater than 10.

3. The process as described in claim 1 in which the multiple of salt to ammonia on a mass basis is preferably greater than 25, 4. The process as described in claim 1 in which BOD is removed from the leachate by a carbon bed after ammonia removal by a carbon bed, 5. The pumping rate to the EWCU is sufficient for removal of impurities of metals, ammonia, bacteria and other organics, hydrocarbon organics.

What is claimed is:

1. A process for removing organics, metals, bacteria or other biologics, BOD, COD, ammonia, PFAS, or other inorganics or combinations thereof from an aqueous leachate from landfills, coal and coal ash storage sites, incinerator sites, or other sites where rainwater can collect waste residuals, wherein the process comprises:
 a) adjusting salt concentration in the aqueous leachate such that the salt concentration is higher than the concentration of ammonia in the adjusted aqueous leachate;
 b) treating the adjusted aqueous leachate with an electric field to form an electric field adjusted aqueous leachate;
 c) treating the electric field adjusted aqueous leachate with a carbon bed;
 d) reacting at least a portion of any ammonia present in the adjusted electric field aqueous leachate under conditions such that the portion of ammonia is converted to nitrogen gas;
 e) oxidizing hydrocarbon based compounds; and
 f) reacting at least a portion of any metals present in the adjusted electric field aqueous leachate under conditions such that the portion of metals is converted to a filterable form.

2. The process of claim 1 wherein the adjusted aqueous leachate comprises a ratio of salt concentration to ammonia concentration of greater than 10 on a mass basis.

3. The process of claim 1 wherein the adjusted aqueous leachate comprises a ratio of salt concentration to ammonia concentration of greater than 25 on a mass basis.

4. The process of claim 1 wherein treating the electric field adjusted aqueous leachate with a carbon bed comprises treating the electric field adjusted aqueous leachate with a carbon bed under conditions to remove at least a portion of BOD.

5. The process of claim 4 wherein the treating of the electric field adjusted aqueous leachate with a carbon bed occurs after the ammonia reacting.

6. The process of claim 1 which further comprises pumping aqueous leachate to an electrical water cleaning unit under conditions sufficient to remove impurities to a level such that the aqueous leachate exiting the electrical water cleaning unit may be treated in a municipal waste facility; wherein the impurities comprise metals, ammonia, bacteria and other organics, hydrocarbon organics, or any combination thereof.

* * * * *